United States Patent
Zapf et al.

(10) Patent No.: US 8,201,393 B2
(45) Date of Patent: Jun. 19, 2012

(54) EXHAUST-GAS AFTERTREATMENT DEVICE

(75) Inventors: Friedrich Zapf, Karlstadt (DE); Heico Stegmann, Wuerzburg (DE); Andreas Lannig, Kreuzwertheim (DE); Klaus Lang, Klingenberg (DE); Christian Schmidt, Obernbreit (DE); Alexandre Branco, Schwebheim (DE)

(73) Assignee: Hilite Germany GmbH, Marktheidenfeld (DE)

( * ) Notice: Subject to any disclaimer, the term of this patent is extended or adjusted under 35 U.S.C. 154(b) by 612 days.

(21) Appl. No.: 12/380,581

(22) Filed: Feb. 26, 2009

(65) Prior Publication Data

US 2009/0229258 A1    Sep. 17, 2009

(30) Foreign Application Priority Data

Mar. 5, 2008   (DE) .................... 10 2008 012 780

(51) Int. Cl.
*F01N 3/00* (2006.01)

(52) U.S. Cl. ............... 60/286; 60/295; 60/297; 60/298; 60/303

(58) Field of Classification Search .................. 60/286, 60/295, 297, 298, 301, 303, 320
See application file for complete search history.

(56) References Cited

U.S. PATENT DOCUMENTS

| | | | |
|---|---|---|---|
| 1,059,370 A | 4/1913 | Johnson | |
| 1,971,026 A | 8/1934 | Beall | |
| 1,999,221 A | 4/1935 | Walker et al. | |
| 2,697,581 A | 12/1954 | Ray | |
| 2,938,703 A | 5/1960 | Dietz | |
| 3,125,063 A | 3/1964 | Hultgren | |
| 3,492,868 A | 2/1970 | Pontis | |
| 3,707,954 A | 1/1973 | Nakada et al. | |
| 3,894,432 A | 7/1975 | Coughlin | |
| 3,903,858 A | 9/1975 | Hecht | |
| 3,958,757 A | 5/1976 | Happel et al. | |
| 4,146,485 A | 3/1979 | Broad | |
| 4,203,554 A | 5/1980 | Zimmer et al. | |
| 4,312,382 A | 1/1982 | Gebauer | |
| 4,529,512 A | 7/1985 | Williamson et al. | |
| 4,530,486 A | 7/1985 | Rusnak | |
| 4,595,037 A | 6/1986 | LeBreton et al. | |
| 4,610,786 A | 9/1986 | Pearson | |
| 4,693,202 A | 9/1987 | Helpiö | |
| 4,714,234 A | 12/1987 | Falk et al. | |
| 4,742,964 A | 5/1988 | Ito et al. | |

(Continued)

FOREIGN PATENT DOCUMENTS

CA    2 199 737    3/1996

(Continued)

OTHER PUBLICATIONS

Bürkert Fluid Control Systems, "Solenoid Valves with Piston, Servo-Assisted", archived Jan. 10, 2005.

*Primary Examiner* — Binh Q Tran
(74) *Attorney, Agent, or Firm* — Lipsitz & McAllister, LLC

(57) ABSTRACT

The invention relates to an exhaust-gas aftertreatment device, comprising a control unit (4) for controlling a diaphragm pump (2) that draws a urea/water solution out of a circuit and pumps it, via a pressure filter (3), to a metering unit comprising an atomizing nozzle for atomizing the urea/water solution into an exhaust-gas stream.

In advantageous developments, the metering unit comprises a metering valve, including an atomizing nozzle, a pressure and temperature sensor, a heating means and a return baffle.

16 Claims, 10 Drawing Sheets

U.S. PATENT DOCUMENTS

| | | | |
|---|---|---|---|
| 4,805,837 A | 2/1989 | Brooks et al. | |
| 4,836,923 A | 6/1989 | Popoff et al. | |
| 4,839,048 A | 6/1989 | Reed et al. | |
| 4,842,737 A | 6/1989 | Reed | |
| 4,963,332 A | 10/1990 | Brand et al. | |
| 5,002,230 A | 3/1991 | Norskov et al. | |
| 5,009,367 A | 4/1991 | Nielsen | |
| 5,017,285 A | 5/1991 | Janik et al. | |
| 5,045,192 A | 9/1991 | Terhune | |
| 5,114,077 A | 5/1992 | Cerny | |
| 5,122,264 A | 6/1992 | Mohr et al. | |
| 5,236,579 A | 8/1993 | Janik et al. | |
| 5,238,224 A | 8/1993 | Horsting | |
| 5,299,776 A | 4/1994 | Brinn, Jr. et al. | |
| 5,356,034 A | 10/1994 | Schlumberger | |
| 5,399,264 A | 3/1995 | Pulek et al. | |
| 5,413,711 A | 5/1995 | Janik | |
| 5,468,388 A | 11/1995 | Goddard et al. | |
| 5,522,218 A | 6/1996 | Lane et al. | |
| 5,605,042 A | 2/1997 | Stutzenberger | |
| 5,680,879 A | 10/1997 | Sheih et al. | |
| 5,685,985 A | 11/1997 | Brown et al. | |
| 5,884,475 A * | 3/1999 | Hofmann et al. | 60/274 |
| 5,968,464 A | 10/1999 | Peter-Hoblyn et al. | |
| 5,976,475 A | 11/1999 | Peter-Hoblyn et al. | |
| 6,063,350 A | 5/2000 | Tarabulski et al. | |
| 6,105,884 A | 8/2000 | Molnar et al. | |
| 6,125,629 A | 10/2000 | Patchett | |
| 6,203,770 B1 | 3/2001 | Peter-Hoblyn et al. | |
| 6,279,603 B1 | 8/2001 | Czarnik et al. | |
| 6,306,192 B1 | 10/2001 | Greif et al. | |
| 6,474,961 B1 | 11/2002 | Timmer et al. | |
| 6,513,323 B1 | 2/2003 | Weigl et al. | |
| 6,516,607 B1 | 2/2003 | Brück et al. | |
| 6,517,047 B2 | 2/2003 | Koch-Groeber | |
| 6,526,746 B1 * | 3/2003 | Wu | 60/286 |
| 6,539,708 B1 | 4/2003 | Hofmann et al. | |
| 6,554,139 B1 | 4/2003 | Maxwell et al. | |
| 6,631,883 B1 | 10/2003 | Van Den Brink | |
| 6,685,829 B1 | 2/2004 | Baumann et al. | |
| 6,912,846 B2 | 7/2005 | Huber et al. | |
| 6,945,035 B2 | 9/2005 | Hirooka et al. | |
| 7,000,381 B2 * | 2/2006 | Maisch | 60/286 |
| 7,100,366 B2 * | 9/2006 | Hager et al. | 60/286 |
| 7,156,239 B2 * | 1/2007 | Klotz et al. | 210/435 |
| 7,278,625 B2 | 10/2007 | Huber et al. | |
| 7,296,689 B2 | 11/2007 | Klotz et al. | |
| 7,316,545 B2 | 1/2008 | Lenke | |
| 7,393,187 B2 | 7/2008 | Weigl | |
| 7,458,204 B2 | 12/2008 | Plougmann | |
| 7,481,049 B2 | 1/2009 | Huber et al. | |
| 7,509,799 B2 * | 3/2009 | Amou et al. | 60/286 |
| 7,594,393 B2 * | 9/2009 | Offenhuber et al. | 60/286 |
| 7,617,991 B2 * | 11/2009 | Wells et al. | 239/5 |
| 7,866,144 B2 * | 1/2011 | Bakaj et al. | 60/286 |
| 7,895,829 B2 * | 3/2011 | Suzuki et al. | 60/286 |
| 2002/0001554 A1 | 1/2002 | Czarnik et al. | |
| 2002/0078732 A1 | 6/2002 | Bentley | |
| 2002/0081239 A1 | 6/2002 | Palesch et al. | |
| 2002/0088955 A1 | 7/2002 | Gamou et al. | |
| 2003/0024320 A1 | 2/2003 | Bentley | |
| 2003/0033799 A1 | 2/2003 | Scheying | |
| 2003/0101716 A1 | 6/2003 | Hirooka et al. | |
| 2003/0168620 A1 | 9/2003 | Dralyuk | |
| 2003/0209482 A1 | 11/2003 | Klotz et al. | |
| 2004/0060286 A1 | 4/2004 | Huber et al. | |
| 2004/0093856 A1 | 5/2004 | Dingle et al. | |
| 2004/0098978 A1 | 5/2004 | Tarabulski et al. | |
| 2004/0101450 A1 | 5/2004 | Mayer | |
| 2004/0103641 A1 | 6/2004 | Maisch | |
| 2004/0159721 A1 | 8/2004 | Shiraishi et al. | |
| 2004/0179960 A1 | 9/2004 | Lenke | |
| 2004/0191093 A1 | 9/2004 | Weigl | |
| 2004/0262333 A1 | 12/2004 | Huber et al. | |
| 2005/0069468 A1 | 3/2005 | Huber et al. | |
| 2005/0229969 A1 | 10/2005 | Nguyen et al. | |
| 2005/0284136 A1 | 12/2005 | Plougmann | |
| 2006/0196172 A1 | 9/2006 | Johnson et al. | |
| 2008/0178580 A1 | 7/2008 | Zapf et al. | |
| 2008/0311010 A1 | 12/2008 | Boe | |
| 2009/0038292 A1 | 2/2009 | Plougmann | |

FOREIGN PATENT DOCUMENTS

| | | |
|---|---|---|
| CH | 359182 | 12/1961 |
| DE | 1 148 614 | 5/1963 |
| DE | 2 121 533 | 11/1972 |
| DE | 22 11 096 | 12/1975 |
| DE | 24 59 790 | 7/1976 |
| DE | 28 12 076 | 10/1979 |
| DE | 83 06 612 | 8/1983 |
| DE | 39 01 032 | 2/1990 |
| DE | 38 33 134 | 4/1990 |
| DE | 41 04 382 | 8/1992 |
| DE | 42 37 900 | 5/1993 |
| DE | 42 30 056 | 3/1994 |
| DE | 43 21 927 | 1/1995 |
| DE | 44 32 576 | 3/1996 |
| DE | 44 32 577 | 3/1996 |
| DE | 44 36 397 | 4/1996 |
| DE | 195 36 613 | 11/1996 |
| DE | 198 17 994 | 11/1999 |
| DE | 198 40 569 | 3/2000 |
| DE | 199 08 671 | 8/2000 |
| DE | 199 35 920 | 3/2001 |
| DE | 199 45 900 | 4/2001 |
| DE | 199 47 198 | 4/2001 |
| DE | 100 47 516 | 4/2002 |
| DE | 100 47 531 | 4/2002 |
| DE | 100 52 077 | 5/2002 |
| DE | 100 52 103 | 5/2002 |
| DE | 100 58 015 | 5/2002 |
| DE | 101 39 142 | 2/2003 |
| DE | 101 47 172 | 4/2003 |
| DE | 101 50 518 | 5/2003 |
| DE | 101 39 139 | 6/2003 |
| DE | 101 61 132 | 6/2003 |
| DE | 102 56 169 | 6/2003 |
| DE | 102 20 672 | 11/2003 |
| DE | 699 10 605 | 6/2004 |
| DE | 699 10 776 | 6/2004 |
| DE | 103 41 996 | 3/2005 |
| DE | 20 2005 002 544 | 5/2005 |
| DE | 103 59 522 | 7/2005 |
| DE | 10 2004 003 201 | 8/2005 |
| DE | 10 2004 006 333 | 9/2005 |
| DE | 10 2004 035 119 | 2/2006 |
| DE | 10 2004 054 238 | 5/2006 |
| DE | 20 2004 020 234 | 5/2006 |
| DE | 10 2005 056 395 | 11/2006 |
| DE | 10 2005 030 421 | 1/2007 |
| DE | 10 2005 037 150 | 2/2007 |
| DE | 10 2006 014 074 | 10/2007 |
| DE | 10 2007 004 687 | 8/2008 |
| EP | 0 663 226 | 7/1995 |
| EP | 0 826 097 | 3/1998 |
| EP | 1 236 499 | 9/2002 |
| EP | 1 281 426 | 2/2003 |
| EP | 1 314 864 | 5/2003 |
| EP | 1 435 458 | 7/2004 |
| EP | 1 481 719 | 12/2004 |
| GB | 2 137 110 | 10/1984 |
| JP | 56 164287 | 12/1981 |
| JP | 2000-240429 | 9/2000 |
| JP | 2001280189 | 10/2001 |
| JP | 2002525491 | 8/2002 |
| WO | 01/91881 | 12/2001 |
| WO | 02/27280 | 4/2002 |
| WO | 02/42616 | 5/2002 |
| WO | 02/50497 | 6/2002 |
| WO | 03/016687 | 2/2003 |
| WO | 03/085270 | 10/2003 |
| WO | 2004/079168 | 9/2004 |
| WO | 2006122561 | 11/2006 |

* cited by examiner

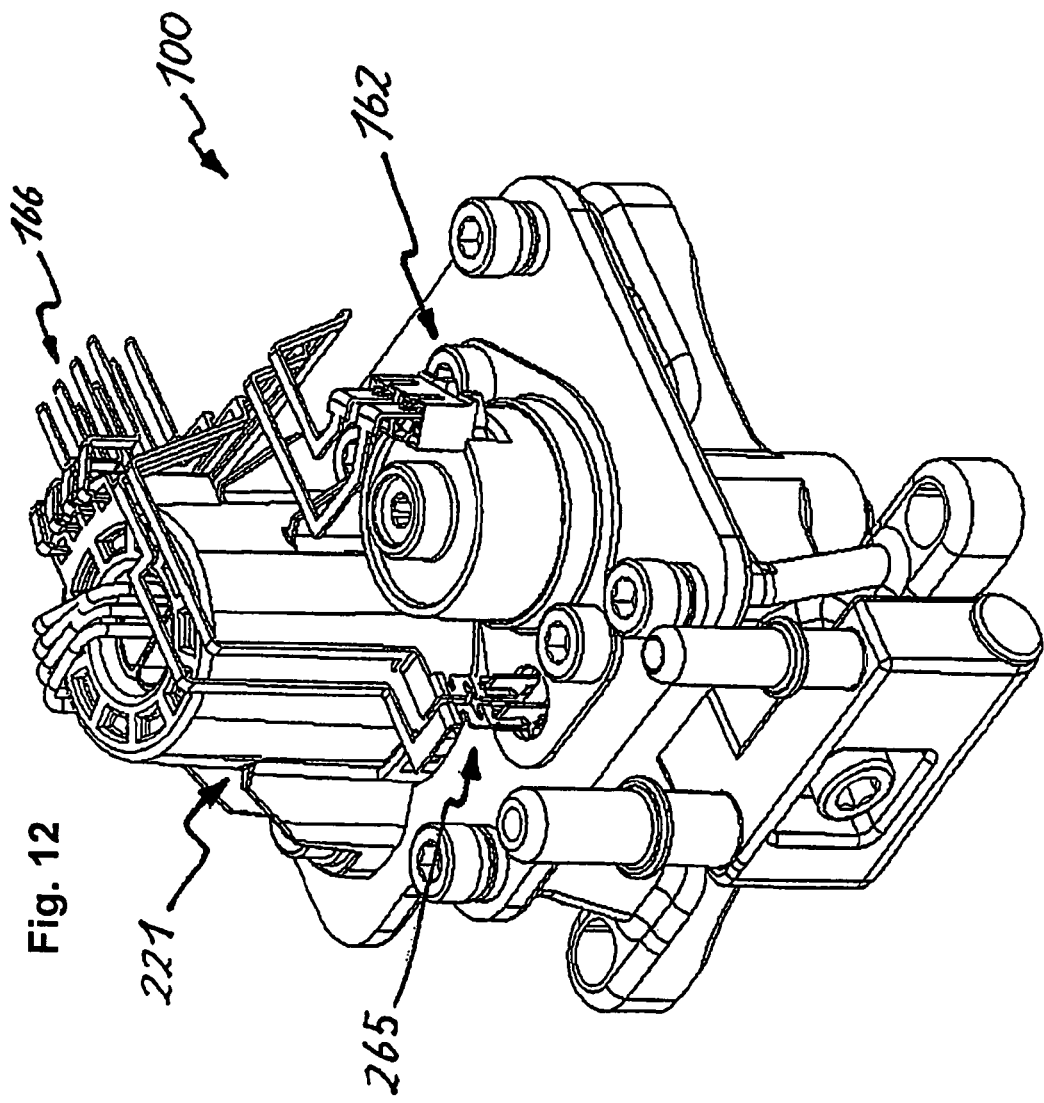

EXHAUST-GAS AFTERTREATMENT DEVICE

This application claims the benefit of German patent application no. 10 2008 012 780.9 filed Mar. 5, 2008, which is incorporated herein and made a part hereof by reference.

BACKGROUND OF THE INVENTION

The invention relates to an exhaust-gas aftertreatment device.

An exhaust-gas aftertreatment device is already known from DE 10 2006 014 074 A1. This device has a diaphragm pump. A control unit is provided, which is realized separately from this pump and which, by means of a nozzle, distributes a urea/water solution in an exhaust-gas stream.

DE 101 50 518 C1 relates to an exhaust-gas aftertreatment device comprising a diaphragm pump that pumps urea/water solution or ammonia/water solution to a metering valve connected to a mixing chamber. On this pressure chamber there is also a compressed-gas connection, such that the urea/water solution, or the ammonia/water solution, can be blown into the exhaust-gas stream for the purpose of exhaust-gas aftertreatment.

DE 101 61 132 A1 relates to an exhaust-gas aftertreatment device comprising a diaphragm pump that pumps a urea/water solution to a metering valve, which injects the urea/water solution into an exhaust-gas stream. The diaphragm pump in this case comprises a supporting body that is connected to the diaphragm and connected to an armature, such that the diaphragm can be moved back and forth by means of an electromagnet. The diaphragm is annular and, via its inner edge, is constrained in the supporting body and, via its outer edge, is constrained so as to be immovable relative to the housing of the diaphragm pump.

DE 22 11 096 relates to a diaphragm pump for vacuum generation. The diaphragm is a closed disc, which at the periphery is constrained in a crankcase and which in the centre is fastened to a connecting rod of a crankshaft drive.

Further, there is already known, from the unpublished DE 10 2007 004 687, an exhaust-gas aftertreatment device in which a urea/water solution is injected into an exhaust-gas line.

SUMMARY OF THE INVENTION

The object of the invention is to create a reliable exhaust-gas aftertreatment device.

This object is achieved in accordance with the claimed invention.

In the following, the urea/water solution is referred to by the abbreviation UWS.

According to an advantage of the invention, a diaphragm pump is used, which pump, owing to the sealing diaphragm, is particularly effective in protecting the pump drive against the aggressive UWS.

According to a further advantage of the invention, the metering unit has an atomizing nozzle for atomizing the UWS in the exhaust-gas stream. In comparison with the injection of a scarcely distributed UWS jet onto a hot surface of the exhaust-gas pipe, atomization has the advantage of a substantially improved distribution, with a correspondingly large reactive surface of the UWS. A very high proportion of the UWS is thereby fully converted, such that particularly good exhaust-gas values are achieved with a low UWS consumption. There is also no need for a hot surface that would additionally require heating during the starting operation or in the warm-up period.

According to a further advantage of the invention, a fine pressure filter is provided in the pump unit, which pressure filter protects the atomizing nozzle of the metering unit against blockage. In this case, this fine pressure filter is arranged in the UWS flow, after the diaphragm pump. Consequently, the pressure loss at the fine pressure filter is less apparent than if this pressure filter were to be arranged in the suction channel, preceding the diaphragm pump. In an advantageous development, a coarse intake filter can be used to protect the diaphragm against coarse soiling, only a small pressure loss occurring at this coarse intake filter. The diaphragm pump—particularly its non-return valves—is thereby also protected against dirt particles. The functional reliability of the diaphragm pump can thus be ensured to a particularly high degree.

According to a further advantageous development, a control unit, for controlling the diaphragm pump, is integrated into the pump unit. In this case, in a particularly advantageous development, a thermally loaded printed circuit board of this control unit can be fastened, so as to be protected against dust within a housing, on an outwardly oriented metal plate, such that the heat of the printed circuit board is directed out from the housing. In order to enhance this cooling of the printed circuit board, the metal plate outside of the housing can be provided with cooling ribs.

In a particularly advantageous development of the invention, the diaphragm of the diaphragm pump is moved back and forth by a crankshaft drive, or by an eccentric gearing. Such a membrane pump drive makes it possible to achieve very high pressures, this rendering possible yet finer atomization of the UWS in the exhaust-gas stream, with the aforementioned advantages.

An atomizing nozzle can be realized, for example, by means of a plurality of discs having such slots and/or holes that multiply divert the UWS, such that a high degree of swirl is imparted to the UWS as it emerges from the atomizing nozzle. This swirl causes the UWS to be atomized as it enters the exhaust-gas stream. Such swirl nozzles are known from the domain of heating burners, said domain being foreign to the classification in question. Swirl nozzles are also known by the English-language technical term of "pressure swirl atomizer".

In a particularly advantageous development, the diaphragm can be supported by means of an additional supporting disc or a rounded contact-pressure sleeve, in order to prevent bending, or increased flexing work, as pressure is built up.

In a particularly advantageous development, the pump unit can be connected to the cooling-water circuit of the motor-vehicle engine. Thus, for example, the UWS and or the control unit can be thawed by the cooling-water circuit of the motor-vehicle engine.

In a particularly advantageous development, the exhaust-gas aftertreatment device can also be realized to be freeze-proof after switch-off, even without supplied energy. Consequently, there is no need for evacuation or valve opening.

With one example embodiment of the present invention, it may be ensured that there is no longer any pressurized UWS in the exhaust-gas aftertreatment device, even after switch-off of the system. This is ensured even if no further pump after-run is possible as a result of the driver of the vehicle having interrupted the electric power supply to the exhaust-gas aftertreatment device, for example by means of an emergency switch-off or disconnection of the vehicle battery. Facilities such as "emergency switch-off" or a facility for rapid disconnection of the battery by means of a lever are provided in the case of certain hazardous-goods transporters. It cannot be precluded that these safety facilities might also be used for normal switch-off, contrary to their intended purpose.

The present invention ensures functioning of the exhaust-gas treatment device following thawing of frozen UWS.

In one example embodiment of the present invention, an exhaust-gas aftertreatment device by means of which a particularly high metering accuracy is achieved. In the case of this example embodiment, the pressure and the temperature of the urea/water solution are measured directly in local proximity before injection by nozzle into the exhaust-gas stream. A pressure and temperature sensor is provided for this purpose in the metering unit.

An electric heating means may be provided for the metering unit, for the purpose of rapid heating, should the metering unit be frozen at low temperatures.

Further advantages of the invention are made evident by the further claims, the description and the drawing.

The invention is explained in the following with reference to an exemplary embodiment.

BRIEF DESCRIPTION OF THE DRAWINGS

FIG. 12 shows a perspective view of the metering unit from FIG. 2a and FIG. 2b, a cover having been removed.

DETAILED DESCRIPTION

Figure 1:
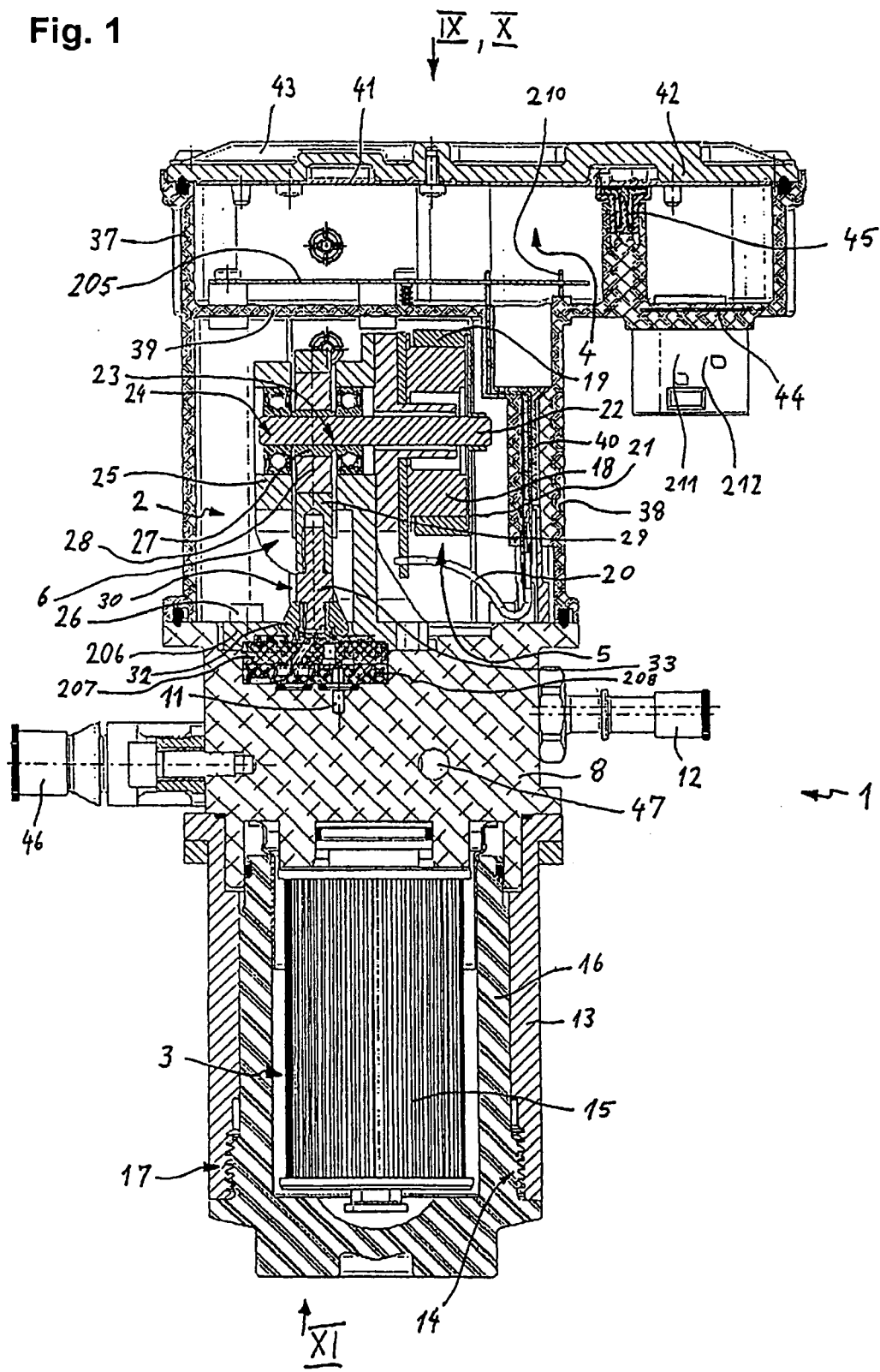
FIG. 1 shows a pump unit for an exhaust-gas aftertreatment device.

FIG. 1 shows a pump unit 1 for an exhaust-gas aftertreatment device, by means of which pump unit a UWS is injected into an exhaust-gas flow of a diesel engine. The pump unit 1 in this case draws in and pressurizes this UWS and feeds the latter, under pressure, to a metering unit 100, shown in FIG. 2a and FIG. 2b, which injects a portion of the UWS into the hot exhaust-gas stream. In addition, the metering unit 100 is cooled by the UWS circulating in the circuit between the pump unit 1 and the metering unit 100.

The pump unit 1 comprises a pump 2, a pressure filter 3 and a control unit 4.

Figure 7:
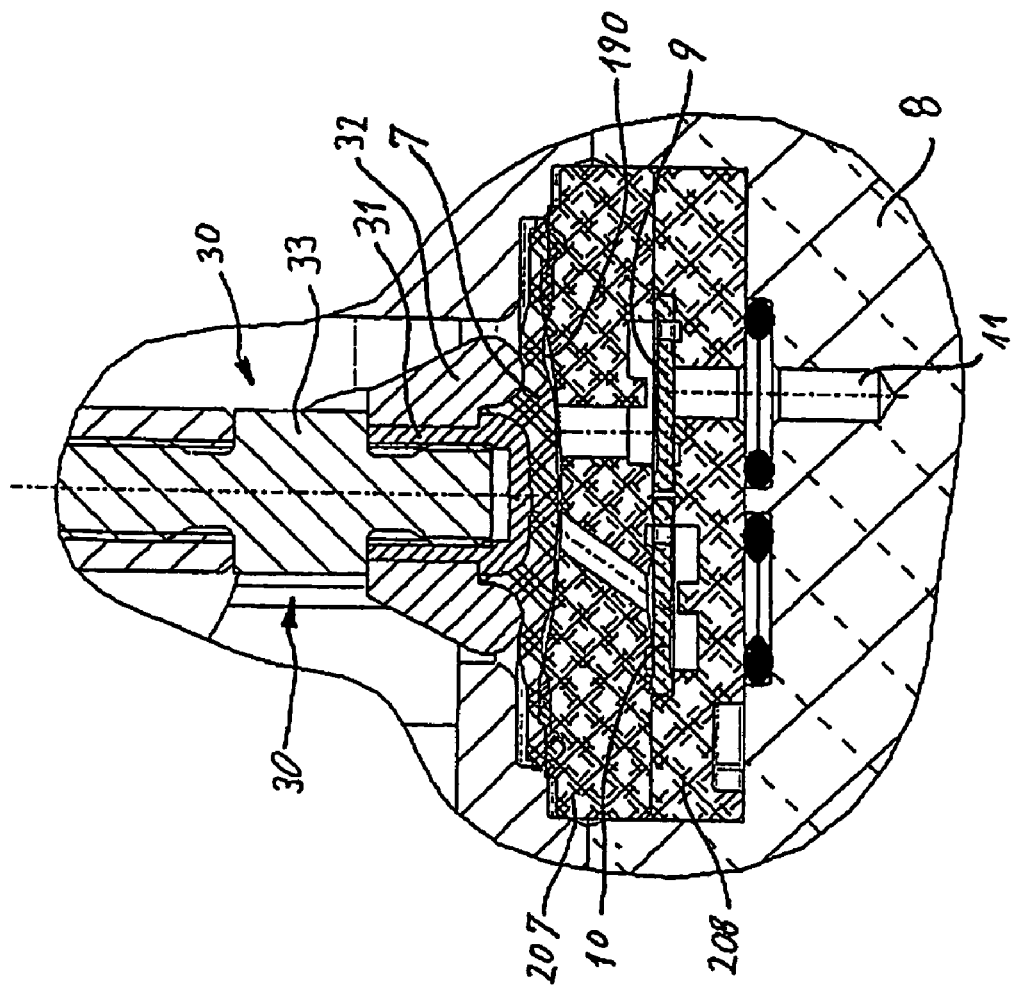
FIG. 7 shows a detail of the pump unit in the region of a diaphragm.

The pump 2 is realized as a diaphragm pump, and comprises a brushless electric motor 5 having an eccentric gearing 6 operating in a manner similar to a crankshaft drive. This eccentric gearing 6 moves the central region of a diaphragm 7 to and fro, which diaphragm is constrained, at its circumference, in an intermediate housing 8. Additionally inserted in this intermediate housing 8 are two plastic discs 207, 208, which can be seen in greater detail in FIG. 7, and which are realized as injection-moulded parts. In this case, the upper plastic disc 207 is placed upon the lower plastic disc 208, such that two non-return valves 9, 10 are constituted as a result of tongue-type shapings in the contact region of the two plastic discs 207, 208. These two non-return valves 9, 10 are realized as blade-type valves. The channels necessary for the UWS flow are also provided in the plastic discs 207, 208. The one non-return valve 10 opens in the one direction, such that a pressure chamber 190, which can be pressurized by the diaphragm 7, can deliver pressurized UWS. The other non-return valve 9 opens in the opposite direction, such that the pressure chamber 190 can draw in UWS. Each non-return valve 9, 10 has its own channel, going out therefrom and recessed into the intermediate housing 8. These channels are sealed by means of O-rings 240, 241. Only a portion 11 of these channels is visible in FIG. 1 and FIG. 7. The non-return valve 9 that draws in UWS draws in the UWS from a UWS suction connection 12, via the portion 11 and a further channel 242 going out from the latter. This further channel 242 and a suction filter 243 arranged in front of the latter can be seen in FIG. 11. The suction filter 243 in this case protects the pump 2 against coarse soiling. This suction filter 243 is built into the UWS suction connection 12.

From the pressure chamber 190, the UWS is routed by the diaphragm 7, via the other non-return valve 10 and the channel, not shown in greater detail, that goes out from the latter, to the pressure filter 3, which is thus realized as a pressure filter. From this pressure filter 3, the UWS is routed to a UWS pressure connection 153, which can be see in FIG. 11. By means of this pressure filter 3, the metering unit 100 is protected against dirt particles, and consequently against blockage. The UWS pressure connection 153 that succeeds the pressure filter 3 is shown schematically in FIG. 3. The UWS pressure connection 153 is connected to the metering unit 100 via the external UWS line 150, which likewise is shown in this FIG. 3. Via the UWS line 151, the UWS suction connection 12 of the pump unit 1 is connected to a UWS tank 200, and the metering unit 100 is connected to the UWS tank 200 by means of a further UWS line 201, such that the flow via a return baffle 223 in the metering unit 100 constitutes a circuit.

The pressure filter 3 comprises a filter cartridge 15, which is inserted in a pot 16. This pot 16 in this case has an external thread 17, which is screwed into an internal thread 14 of a sleeve 13. The internal thread 14 in this case is arranged at the one end of the sleeve 13.

At its other end, the sleeve 13 is immovably connected to the intermediate housing 8. The filter cartridge 15 is thus drawn tightly against the intermediate housing 8.

The electric motor 5, realized in a space-saving manner as an external rotor motor, revolves for the purpose of bending the diaphragm 7 back and forth. Consequently, a stationary stator 18 of the electric motor 5 is enclosed by a rotor 19, radially within the latter. The stator 18 has coils having wires 20 that lead to a motor control printed circuit board 205 within the control unit 4. On the side facing away from the eccentric gearing 6, the rotor 19 is connected to a centrally perforated disc 21, through the central hole of which a shaft 22 is inserted in such a way that the rotor 19 and the shaft 22 are rotationally fixed in relation to one another. The shaft 22 is mounted in rolling bearings, being two rolling bearings 23, 24, in the region of the eccentric gearing 6. These two rolling bearings 23, 24 are accommodated in a bearing housing 25, which is immovably connected to the intermediate housing 8. A screwed connection 26 is provided for this purpose. By means of this screwed connection 26, the diaphragm 7 in this case is constrained between a carrier plate 206 of the bearing housing 25 and the upper plastic disc 207. In the region between the two rolling bearings 23, 24, an eccentric 27 is pressed non-positively onto the shaft 22. The central axis of this eccentric 27 is offset parallelwise relative to the axis of rotation of the shaft 22. A rolling bearing 28 of a connecting rod 29 is arranged coaxially on the eccentric 27. Its other end is screw-connected, via a threaded bolt 30, to a supporting bush 31, which is immovably connected to a rounded contact-pressure sleeve 32. The supporting bush 31 is vulcanized into the diaphragm. The contact-pressure sleeve 32 serves to support the diaphragm 7 during the pressure stroke. The threaded bolt 30 is provided with a central hexagon 33, and is threaded at both of its ends.

The rolling bearings 23, 24 and 28 have a permanent grease filling for the purpose of lubrication.

Figure 8:
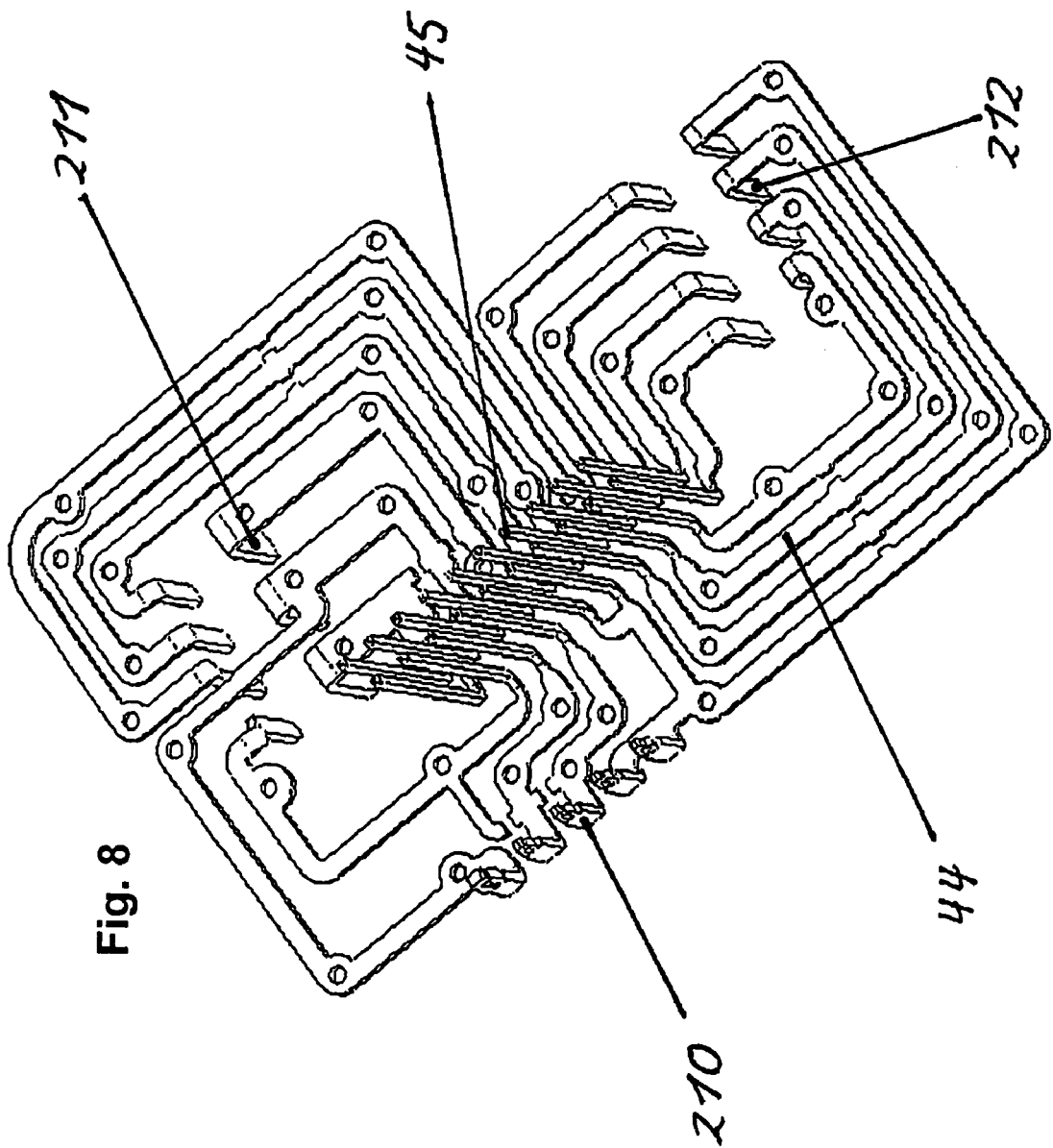
FIG. 8 shows a stamped grid, which is coated with the plastic of the pump unit.

The control unit 4 is arranged within a control housing 37, which is realized to constitute a single piece with a pump housing 38. The control housing 37 is divided from the pump housing 38 in an oil-tight manner by means of a dividing wall 39, the said wires 20 of the coils being connected to the motor control printed circuit board 205 by means of conductor tracks 40 that are inlaid in the injection-moulded plastic material of the pump housing 38. The functions of metering control, pressure regulation, sensor evaluation and CAN communication are located on a further printed circuit board 41. The further printed circuit board 41 is screwed onto one side of an aluminium plate 42, on the other side of which cooling ribs 43 are arranged. This aluminium plate 42 is placed into an opening of the control housing 37 in such a way that the cooling ribs 43 face outwards and thus direct away outwards the heat from the printed circuit board 41 comprising the electronics. For the purpose of connecting the motor control printed circuit board 205,
 the further printed circuit board 41 and
 the CAN bus of the vehicle, a stamped printed circuit board 44 is coated with the plastic of the control housing 37. This stamped printed circuit board 44 can also be seen in FIG. 8, and has four blade-type contact plug connectors 45, 210, 211, 212 extending perpendicularly away from the stamped printed circuit board 44. A 20-pole contact plug connector 45 effects connection of the stamped printed circuit board 44 to the further printed circuit board 41. This connection is created when the printed circuit board 41 is placed on the control housing 37. A 4-pole contact plug connector 210 effects the connection to the motor control printed circuit board 205. There are two contact plug connectors 211, 212 for effecting outward connection. The 8-pole contact plug connector 211 effects the connection to the metering unit 100 for the purpose of controlling, or supplying electric power to, its metering valve 34,
 controlling, or supplying electric power to, an electric heating means 265,
 supplying electric power to a pressure and temperature sensor 221, and
 receiving signals from its pressure and temperature sensor 221.

The 7-pole contact plug connector 212 effects the connection to the vehicle electronics and to the voltage supply. Communication in this case is effected via CAN bus signals.

Figure 9:
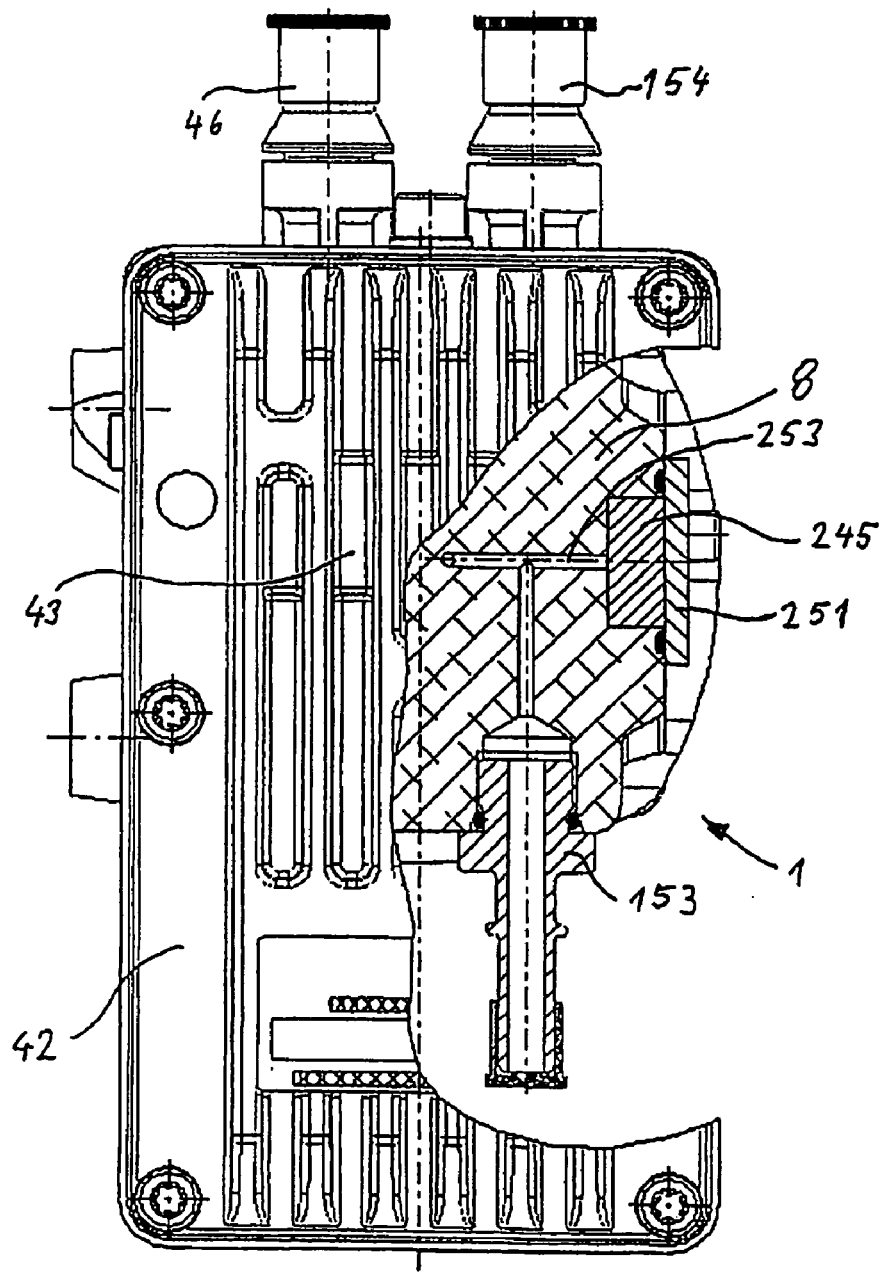
FIG. 9 shows a top view of the pump unit according to arrow IX from FIG. 1, the representation showing the pump unit opened up in the region of a compressible equalization element.
Figure 10:
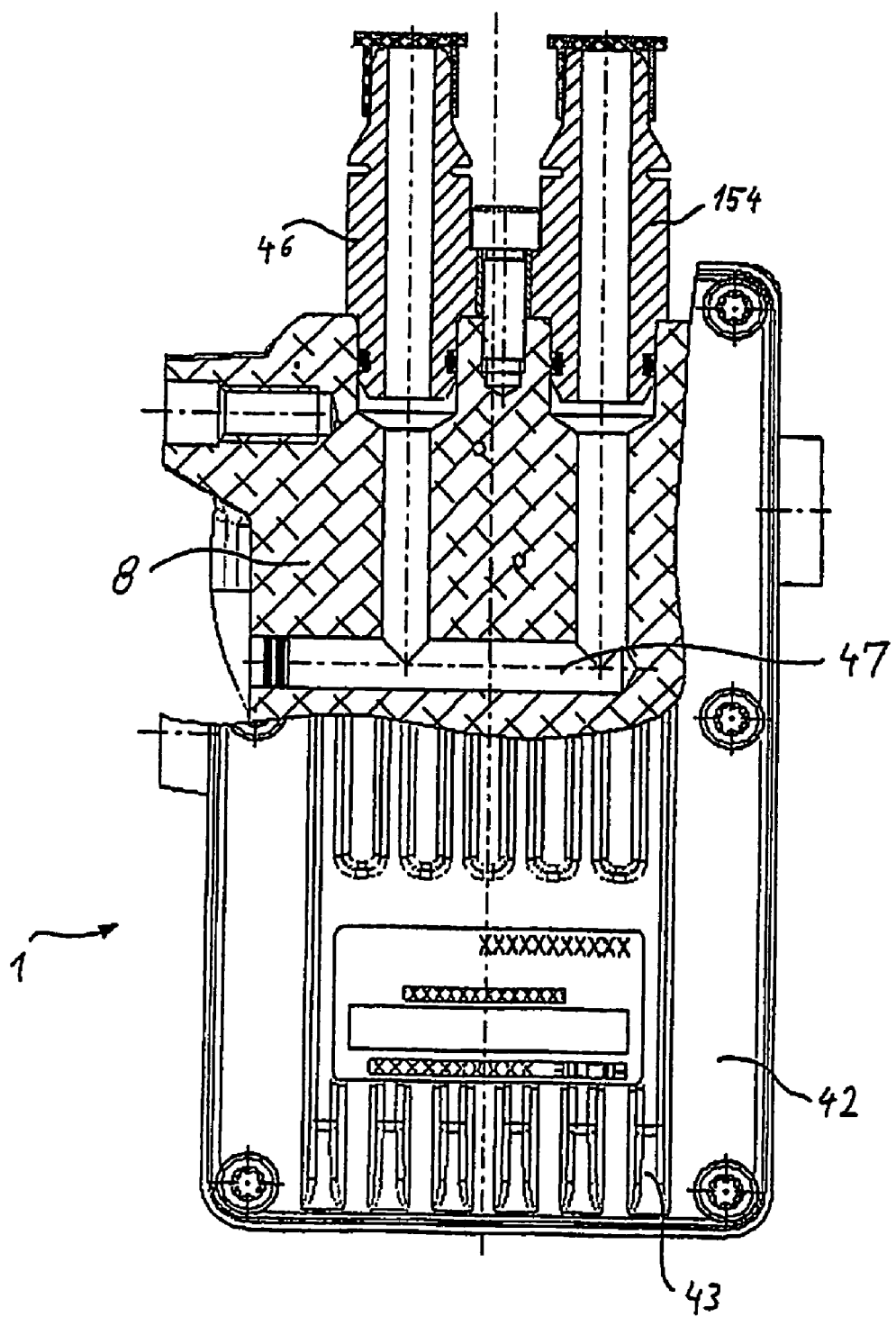
FIG. 10 shows a top view of the pump unit according to arrow X from FIG. 1, the representation showing the pump unit opened up in the region of a cooling-water connection.
Figure 11:
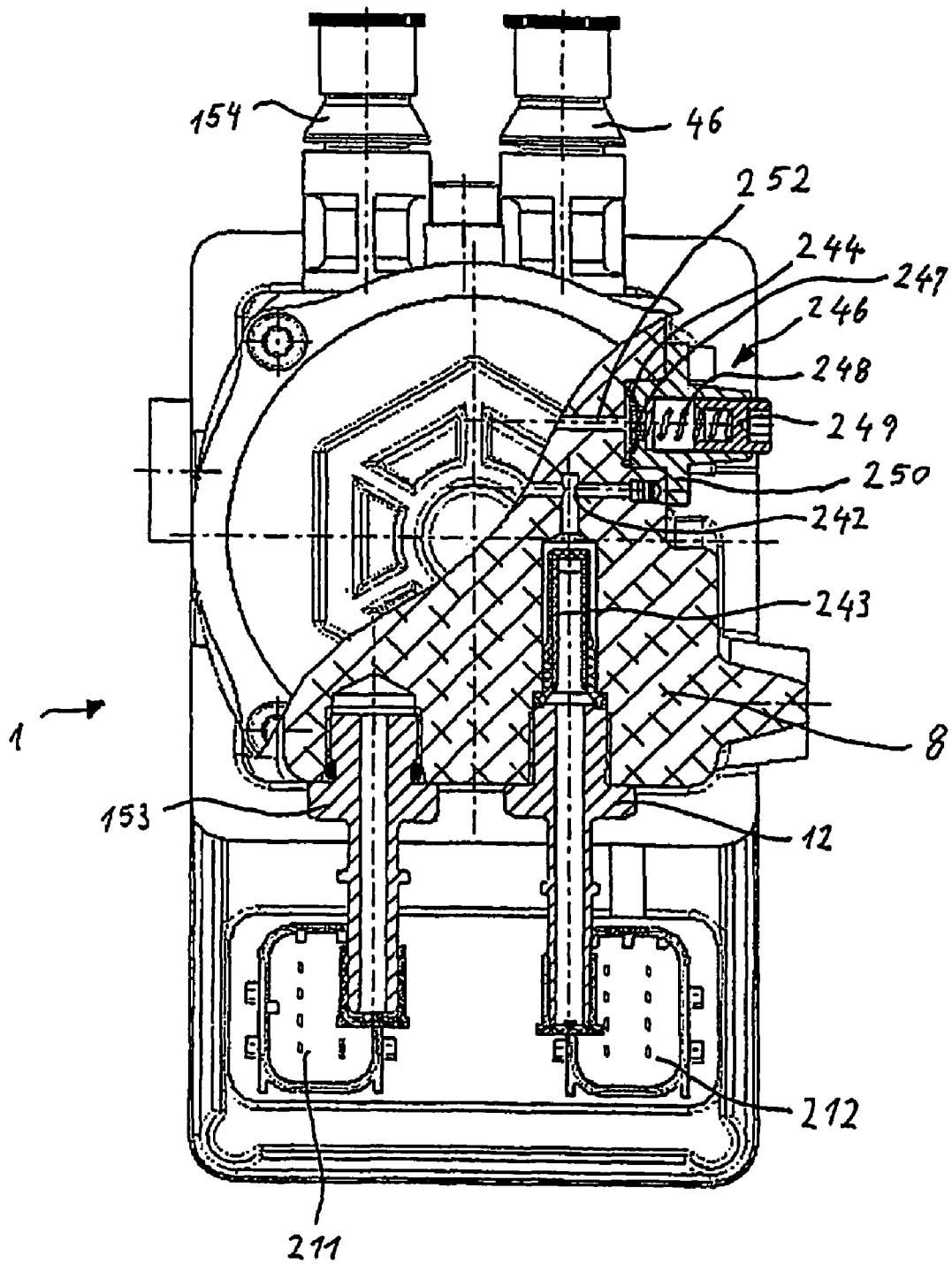
FIG. 11 shows a bottom view of the pump unit according to arrow XI from FIG. 1, the representation showing the pump unit opened up in the region of UWS connections and a pressure-limiting valve.

Provided on the side of the intermediate housing 8 that is opposite the suction connection 12 are two cooling-water connections 46, 154, which can be seen, in particular, in FIG. 9 to FIG. 11. These two cooling-water connections 46, 154 lead to the two ends of a cooling channel 47 recessed into the intermediate housing 8. Since, on the other hand, the two cooling-water connections 46, 154 are connected into a cooling-water circuit 227 of a motor vehicle engine 155, which cooling-water circuit can be seen in FIG. 3, the pump unit 1 can thus be thawed, or kept at an operationally warm temperature, by the hot cooling water from the cooling-water circuit 227 of the motor vehicle engine 155.

Figure 2:
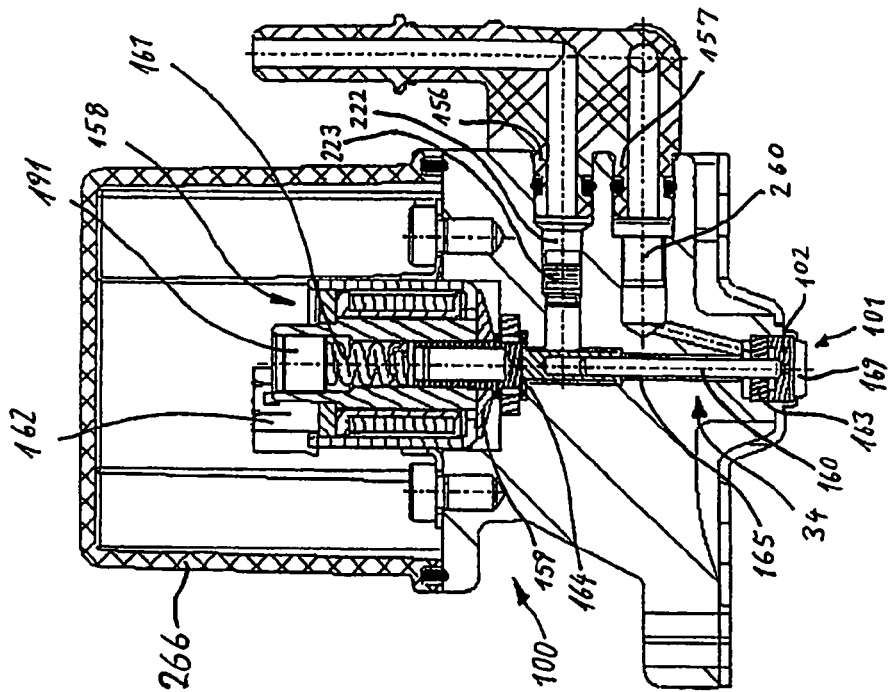
FIG. 2a shows, in a first view, a metering unit connected to the pump unit according to FIG. 1 via UWS lines represented in FIG. 3.
FIG. 2b shows the metering unit from FIG. 2a, in a second view.
Figure 4:
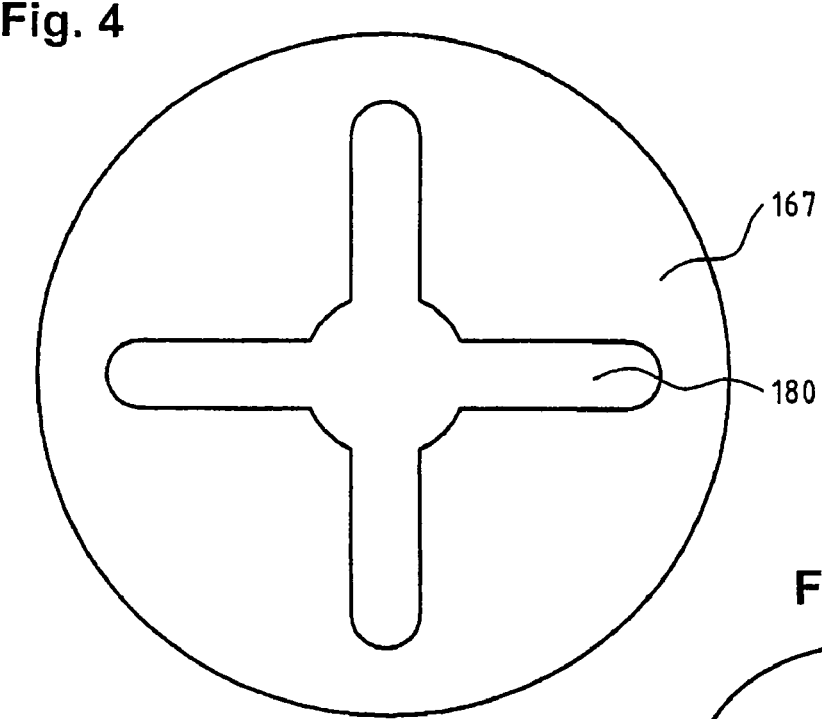
FIG. 4 shows a nozzle disc of an atomizing nozzle that is used in the metering unit according to FIG. 2a and FIG. 2b.
Figure 6:
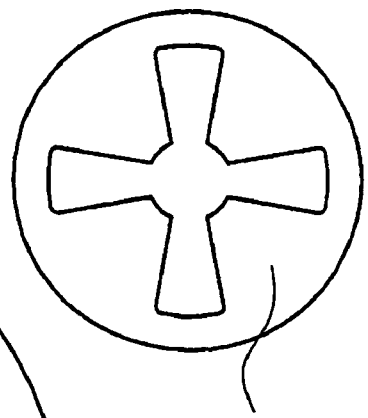
FIG. 6 shows an adapter plate that is arranged between the nozzle disc set and a valve seat from FIG. 2a and FIG. 2b.
Figure 5:
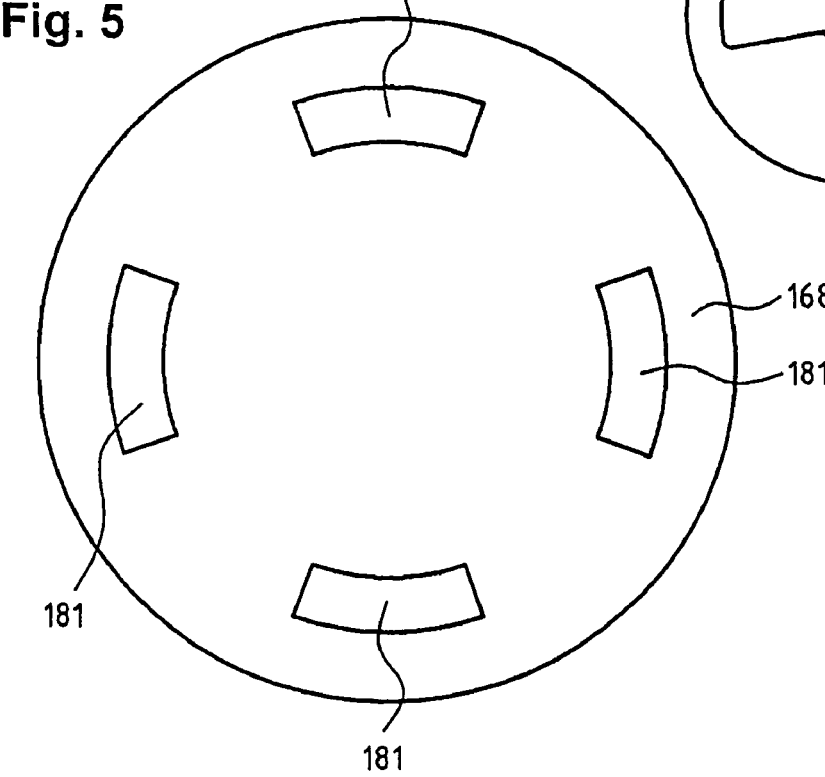
FIG. 5 shows a further nozzle disc that, together with the nozzle disc according to FIG. 4, constitutes a nozzle disc set.

The metering unit 100, represented in greater detail in FIG. 2a and FIG. 2b, comprises the electromagnetic metering valve 34. This electromagnetic metering valve 34 has an electromagnet 158 comprising an armature 159, which can compress a helical compression spring 161 against its spring force, such that the UWS pressure can slide a needle 160 into the open position. The helical compression spring 161 in this case bears against a threaded bolt 191, by means of which the bias of the helical compression spring 161 can be set. If the electromagnet 158 is not energized via its connections 162, the helical compression spring 161 presses the needle 160 back against a valve seat 102, into a closed position. The needle 160 in this case is relatively long and guided, on the one hand, in a linear plain bearing 163. On the other hand, guidance is effected by means of a sealing membrane 164, which protects the electromagnet 158 against the aggressive UWS. Provided between these two guides is a cooling channel 165, which closes the circuit between two metering unit connections 156, 157. For this purpose, these metering unit connections 156, 157 are connected to the UWS lines 150, 201. From the one metering unit 157 that is realized as an intake, the UWS is routed via a filter sieve 260, through a plurality of recesses in the front linear plain bearing 163, to the valve seat 102. If, when the electromagnet 158 is in the energized state, the UWS is allowed to pass through a central opening in the valve seat 102, the UWS is routed through an atomizing nozzle 101. This atomizing nozzle 101 is realized as a swirl nozzle, and comprises the two nozzle discs 167, 168, represented in FIG. 4 and FIG. 5, which are placed over one another. These two nozzle discs 167, 168 in this case are tensioned against the valve seat 102 by means of an outlet nozzle insert 169, an adapter plate 170, which can be seen in FIG. 6, also being tensioned between the nozzle discs 167, 168 and the valve seat 102. For the purpose of effecting the tensioning of the adapter plate 170 and the nozzle discs 167, 168, a dovetailed joint, not represented in greater detail, is provided on the outlet nozzle insert 169. This outlet nozzle insert 169 has an outlet—not shown in greater detail—that widens in the shape of a funnel. Owing to the shape of openings 180, 181 of the nozzle discs 167, 168, the outflowing UWS undergoes swirling, which atomizes the UWS as it emerges.

Figure 3:
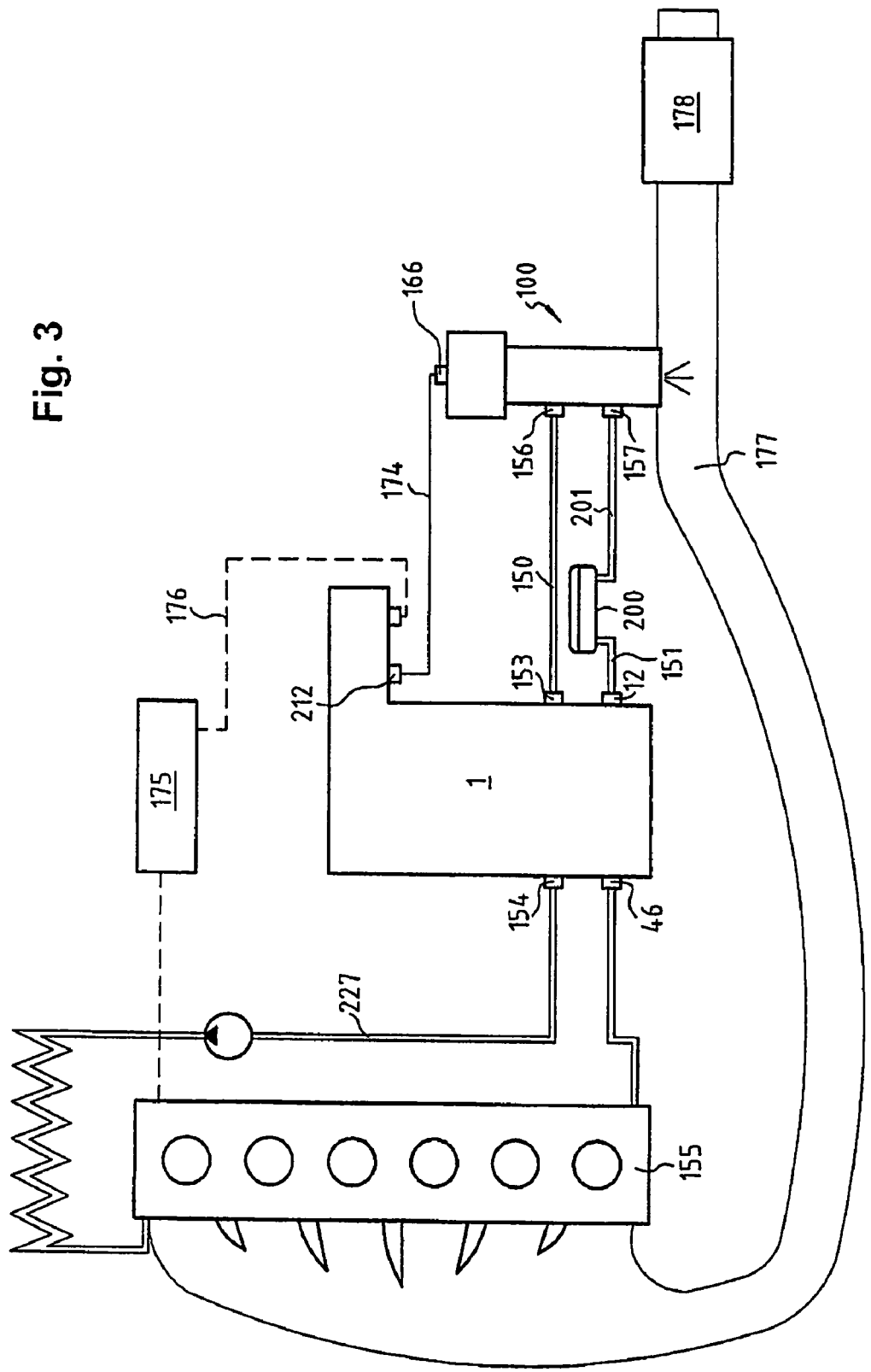
FIG. 3 shows the exhaust-gas aftertreatment device.

The UWS is injected by nozzle, according to FIG. 3, into a region of the exhaust-gas line 177 that precedes a catalytic converter 178.

The metering unit 100 is connected to the pump unit 1 via an 8-pole contact plug connector 166, an electric line 174 and the 8-pole contact plug connector 212. In this case, the electronics of the control unit 4 comprise an output stage, such that the voltage for opening the electromagnetic metering valve 34 can be applied directly to the connections 162 of the electromagnet 158, which are connected via the 8-pole contact plug connectors 212, 166. FIG. 12 shows the metering unit 100 without a cover 266. It can be seen from this FIG. 12 in this case that the 8-pole contact plug connector 166 of the metering unit 100 is connected not only to the connections 162 of the electromagnet 158. The 8-pole contact plug connector 166 is also connected to the electric heating means 265 of the metering valve 34, and to the pressure and temperature sensor 221. Via a signal line 176, the pump unit 1 receives information from a control device 175, which communicates with the engine controller of the motor vehicle engine 155. This signal line relays, inter alia, CAN bus signals.

The metering unit 100 comprises the return baffle 223, in a return channel 222, preceding the metering unit connection 156. By means of this return baffle 223, a continuous flow of UWS through the metering unit 100 is ensured. As a result, on the one hand, the temperature of the metering unit 100 is kept low. On the other hand, upon the electric power supply being switched off, the pressure in the exhaust-gas aftertreatment device is relieved to tank pressure, without this requiring energy for opening of a valve.

All components of the exhaust-gas aftertreatment device are so realized that freezing of the unpressurized UWS does not result in damage.

This thus applies to the metering unit 100. In the electromagnetic metering valve 34, the UWS can expand against the sealing membrane 164. The pressure and temperature sensor 221 has a built-in metal bellows 224, which can expand against a compression spring 225.

This also applies, however, to the pump unit 1. In this pump unit 1, the UWS can expand against
the diaphragm 7,
a limiter diaphragm 244, which can be seen in FIG. 11, and
a compressible equalization element 245, which can be seen in FIG. 9.

The limiter diaphragm 244, which can be seen in FIG. 11, belongs to a pressure limiting valve 246. Provided on the side of the limiter diaphragm 244 that faces away from the pressure limiting valve 246 is a branch channel 252, which is integrated into the UWS flow in the intermediate housing 8. The pressure limiting valve 246 has a limiter housing 250, which is firmly screw-connected to the intermediate housing 8. Within the limiter housing 250, the limiter diaphragm 244 bears elastically on a setting element 249, via a central supporting and guide disc 247 and a helical compression spring 248. This setting element 249 is screwed into the limiter housing 250 from the outside. The bias of the helical compression spring 248 can be set by screwing it in and out.

The compressible equalization element 245, which can be seen in FIG. 9, is held in a recess of the intermediate housing 8 by means of a cover 251. By means of a branch channel 253, the compressible equalization element 245 is integrated into the UWS flow to the UWS pressure connection 153. In order to prevent escape of the aggressive UWS, an O-ring is arranged sealingly between the cover 251 and the intermediate housing 8.

A compressible equalization element, similar to the equalization element 245, can also be arranged in or next to the pressure filter 3.

The other components of the exhaust-gas aftertreatment device, i.e., in particular,
the tank 200,
the UWS lines 150, 151, 201,
the UWS suction connection 12,
the UWS pressure connection 153, and
the metering unit connections 156, 157
are likewise freeze-proof, owing to the selected material and/or compressible equalization elements.

If, in an alternative embodiment, individual components or all components are not designed to be freeze-proof, then it is also possible to provide a facility that enables the UWS to be drawn out or pumped out from the pump unit, such that, in the case of external temperatures below zero, there is no risk of their being destroyed as a result of expanding UWS.

The two metering unit connections 156, 157 are combined in a common assembly that is screw-connected to the metering unit 100 by means of a central screw. Likewise, the cooling-water connections 46, 154 are combined in a common assembly that is screw-connected to the pump unit 1 by means of a central screw. The two assemblies can be produced from differing materials. Thus, in addition to plastic, aluminium or special stainless steel are also possible.

The exhaust-gas aftertreatment device represented can be applied, in particular, in the case of a heavy commercial vehicle, since, on the one hand, such a vehicle is usually realized with a diesel engine. $NO_x$ reduction is particularly necessary in the case of diesel engines. On the other hand, in the case of such a heavy commercial vehicle, the structural space conditions and accelerations are such that it is possible to arrange a metering unit that is relatively large and heavy because of the electromagnet 158. However, the invention can also be applied in the case of small passenger vehicles. Further, the invention can also be applied in the case of petrol engines.

Instead of the swirl nozzle, a different atomizing nozzle can also be provided.

The pump unit housing need not be composed of the separate housing parts pump housing, intermediate housing and sleeve. A single-part pump unit housing can also be provided. It is also possible for only the pressure filter and the intermediate housing to be realized as a single part. Alternatively, the intermediate housing is realized as a single part only with the pump housing. Further, a division can be provided between the pump housing and the control housing.

In an alternative development, no threaded bolt 30 is provided. Instead, the contact-pressure sleeve 32 is screw-connected directly to the connecting rod.

Instead of the rolling bearing 28, a plain bearing can also be used.

The two printed circuit boards of the pump unit can also be combined as one printed circuit board.

The electric heating of the metering valve can be realized as PTC heating. Alternatively, this heating can also be realized as a channel that is integrated into the cooling-water circuit of the motor vehicle engine.

The embodiments described are merely exemplary developments. A combination of the described features for differing embodiments is likewise possible. Further features of the device parts appertaining to the invention, in particular features not described, can be inferred from the geometries of the device parts represented in the drawings.

What is claimed is:
1. Exhaust-gas aftertreatment device, comprising:
a diaphragm pump,
a pressure filter disposed downstream of the diaphragm pump,
a metering unit,
a control unit for controlling the diaphragm pump, and
a pump unit, which comprises the diaphragm pump, the pressure filter and the control unit,
the diaphragm pump being adapted to draw a urea/water solution out of a circuit and pump the urea/water solution through the pressure filter to the metering unit, said metering unit comprising an atomizing nozzle for atomizing the urea/water solution into an exhaust-gas stream, wherein:

provided between the diaphragm pump and the pressure filter there is a housing part of a pump unit housing within which channels extend for routing the urea/water solution, and a cooling-water channel is provided in the pump unit, the cooling-water channel being connected to a cooling-water circuit of a motor vehicle engine, such that the urea/water solution can be thawed within the pump unit.

2. The exhaust-gas aftertreatment device according to claim 1, wherein the urea/water solution is routed from the pressure filter to a pressure connection of the pump unit, and into a urea/water line, which leads to a metering unit connection of the metering unit.

3. The exhaust-gas aftertreatment device according to claim 1, wherein a catalytic converter succeeds the atomizing nozzle in the exhaust-gas stream.

4. The exhaust-gas aftertreatment device according to claim 1, wherein the atomizing nozzle is a swirl nozzle.

5. The exhaust-gas aftertreatment device according to claim 1, wherein a diaphragm of the diaphragm pump that builds up pressure in a pressure chamber is realized as a closed component, on which a supporting element of a connecting rod bears on one side.

6. The exhaust-gas aftertreatment device according to claim 1, wherein the control unit is arranged in a control housing and comprises a printed circuit board, which is fastened on a metal plate in such a way that heat is directed outwards.

7. The exhaust-gas aftertreatment device according to claim 6, wherein the metal plate has at least one outwardly directed rib.

8. The exhaust-gas aftertreatment device according to claim 1, wherein the diaphragm is moved back and forth by an eccentric gearing.

9. The exhaust-gas aftertreatment device according to claim 1, wherein the pressure filter is tightly screw-connected to the pump unit.

10. The exhaust-gas aftertreatment device according to claim 1, wherein the metering unit comprises a metering valve, which, together with a tank, is integrated into a circuit of the circulating urea/water solution, such that the metering valve is cooled and a pressure in the urea/water solution can be relieved, even without supplied electric power, via a return baffle in the flow from the metering valve to the tank.

11. The exhaust-gas aftertreatment device according to claim 1, wherein the diaphragm of the diaphragm pump is provided in the pump unit, at least one compressible component is provided in the metering unit, a pressure relief device is provided in a tank for the urea/water solution, and elastically deformable urea/water solution lines are provided.

12. The exhaust-gas aftertreatment device according to claim 11, wherein the compressible component of the metering unit is a sealing membrane.

13. The exhaust-gas aftertreatment device according to claim 11, wherein the compressible component of the metering unit is a bellows.

14. The exhaust-gas aftertreatment device according to claim 11, wherein the channels for routing the urea/water solution are connected to a compressible equalization element.

15. The exhaust-gas aftertreatment device according to claim 1, wherein a pressure and temperature sensor, for measuring the pressure and the temperature of the urea/water solution, is provided in the metering unit.

16. The exhaust-gas aftertreatment device according to claim 1, wherein the metering unit has an electric heating means.

* * * * *